United States Patent
Morgans et al.

(10) Patent No.: US 11,584,449 B2
(45) Date of Patent: Feb. 21, 2023

(54) EXTRUSION WITH CORNER AND CENTER CHANNELS

(71) Applicant: Ford Global Technologies, LLC, Dearborn, MI (US)

(72) Inventors: Shawn Michael Morgans, Chelsea, MI (US); Stephen William Gallagher, Bloomfield Hills, MI (US); Vladimir Vladimirovich Bogachuk, West Bloomfield, MI (US); Musheeruddin Zubair Syed, Farmington Hills, MI (US); Conor Daniel Hennessey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 17/161,143

(22) Filed: Jan. 28, 2021

(65) Prior Publication Data
US 2022/0234656 A1    Jul. 28, 2022

(51) Int. Cl.
*B60J 7/00* (2006.01)
*B62D 29/00* (2006.01)

(52) U.S. Cl.
CPC .................. *B62D 29/008* (2013.01)

(58) Field of Classification Search
CPC ........ E04F 15/02038; E04F 2201/0138; E04F 2201/0153; E04F 15/02; E04F 2201/0146; E04F 13/06; E04F 2013/063; F24F 13/0209; F16L 23/14; B29K 2075/00
See application file for complete search history.

(56) References Cited

U.S. PATENT DOCUMENTS

| | | | | |
|---|---|---|---|---|
| 5,059,056 A * | 10/1991 | Banthia | ............ | A47B 47/0008 403/231 |
| 5,362,121 A * | 11/1994 | Enning | ............ | B62D 25/2081 280/787 |
| 5,609,004 A * | 3/1997 | Kreis | ............... | B62D 29/008 403/231 |
| D419,055 S * | 1/2000 | Monson | ............ | D8/382 |
| 6,679,545 B1 * | 1/2004 | Balzer | ............... | B62D 25/084 296/203.02 |
| 7,063,376 B2 * | 6/2006 | Ori | ............... | B62D 29/007 296/29 |
| 10,137,935 B2 * | 11/2018 | Koch | ............... | B62D 29/043 |
| 2004/0155487 A1 * | 8/2004 | Joaquin | ............ | B62D 29/008 296/204 |
| 2018/0056352 A1 | 3/2018 | Weykamp et al. | | |

FOREIGN PATENT DOCUMENTS

| | | |
|---|---|---|
| CN | 104890604 B | 7/2017 |
| JP | 2017-141860 A | 8/2017 |
| KR | 10-2007-0031497 A | 3/2007 |

\* cited by examiner

*Primary Examiner* — Kiran B Patel
(74) *Attorney, Agent, or Firm* — Burris Law, PLLC

(57) ABSTRACT

The present disclosure is directed to extrusion for a vehicle component. The vehicle component includes a plurality of flanges that form a periphery of the vehicle component, a cavity that extends through the periphery of the vehicle component, a corner portion that is positioned proximate to a corner defined by a pair of the plurality of flanges, and a channel that is positioned proximate to the corner portion.

15 Claims, 5 Drawing Sheets

EXTRUSION WITH CORNER AND CENTER CHANNELS

BACKGROUND

Technical Field

The present disclosure generally relates to a design of a vehicle component that may be subjected to high loads.

Description of the Related Art

Various components of a vehicle, such as front rails, rear rails, etc., may be subjected to high loads. It may be desirable to improve the strength capabilities of such components.

BRIEF SUMMARY

The present disclosure provides various embodiments of extrusion, which may take various forms of vehicle components that can efficiently absorb axial loads while reducing the weight foot print. For example, in one embodiment, a vehicle component includes a plurality of flanges that form a periphery of the vehicle component, a cavity extending through the periphery of the vehicle component, a corner portion positioned proximate to a corner defined by a pair of the plurality of flanges, and a channel positioned proximate to the corner portion.

For example, in another embodiment, an extrusion for a vehicle component includes a first flange, a second flange extending perpendicularly to the first flange, a third flange extending parallel to the first flange, a fourth flange extending perpendicularly to the first flange, the first, second, third, and fourth flanges forming a periphery, and a first channel positioned at a first corner of the periphery.

For example, in another embodiment, an aluminum extrusion includes a first flange extending in a first direction, a second flange extending in a second direction, a third flange spaced apart from the first flange in the second direction and extending in the first direction, a fourth flange spaced apart from the second flange in the first direction and extending in the second direction, and channel portions positioned at corners defined by the first, second, third, and fourth flanges.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
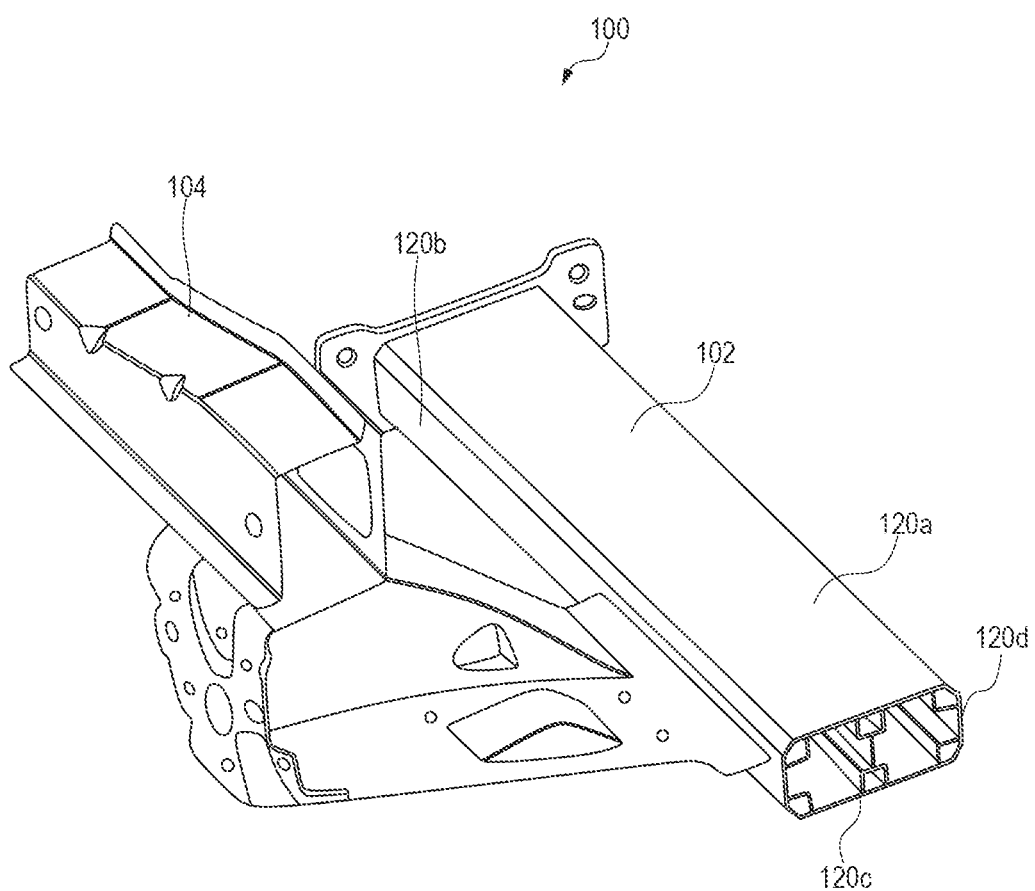
FIG. 1 is a perspective view of a portion of a vehicle, illustrating an extruded vehicle component, according to one embodiment of the present disclosure.

FIG. 1 illustrates a portion of a vehicle 100, which includes a vehicle component 102 that is coupled to surrounding components 104. The vehicle component 102 may take a wide variety of forms, such as a front rail, a rear rail, a bumper, a seat cross-member, a rocker reinforcement, a crush can, a roof bow, a door beam, an instrument panel beam, a high-voltage battery compartment part, and a subframe part. As described in more detail below, the vehicle component 102 is made from a hollow extrusion. In some embodiments, the extrusion may be an aluminum extrusion. In other embodiments, the extrusion may comprise other metals, e.g., titanium, polymers, ceramics, and other suitable materials.

The vehicle component 102 includes a plurality of flanges 120a, 120b, 120c, and 120d. Each of the flanges 120a-120d includes an outer surface and an interior surface. The vehicle component 102 may couple with the surrounding components 104 through, for example, the outer surface of the flange 120b.

Figure 2:
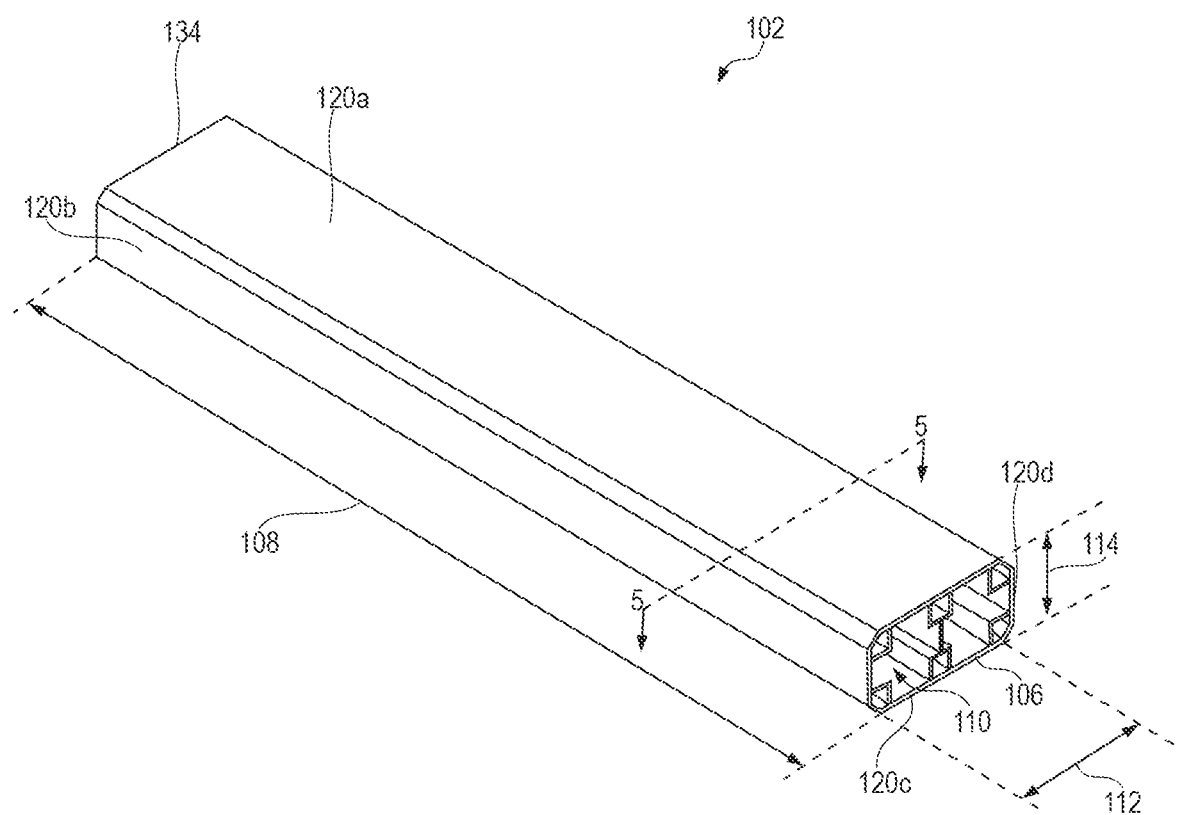
FIG. 2 is a perspective view of the vehicle component of FIG. 1.

FIG. 2 is a perspective view of the vehicle component 102. The vehicle component 102 extends linearly between a front end 106 and a rear end 134 of the vehicle component 102 by a certain length 108. The vehicle component 102 includes a cavity 110 extending along the length 108 of the vehicle component 102. A lateral extension with a width 112 extends linearly between the flanges 120b and 120d of the vehicle component 102. Similarly, a vertical extension with a height 114 extends linearly between the flanges 120a and 120c of the vehicle component 102.

Figure 3:
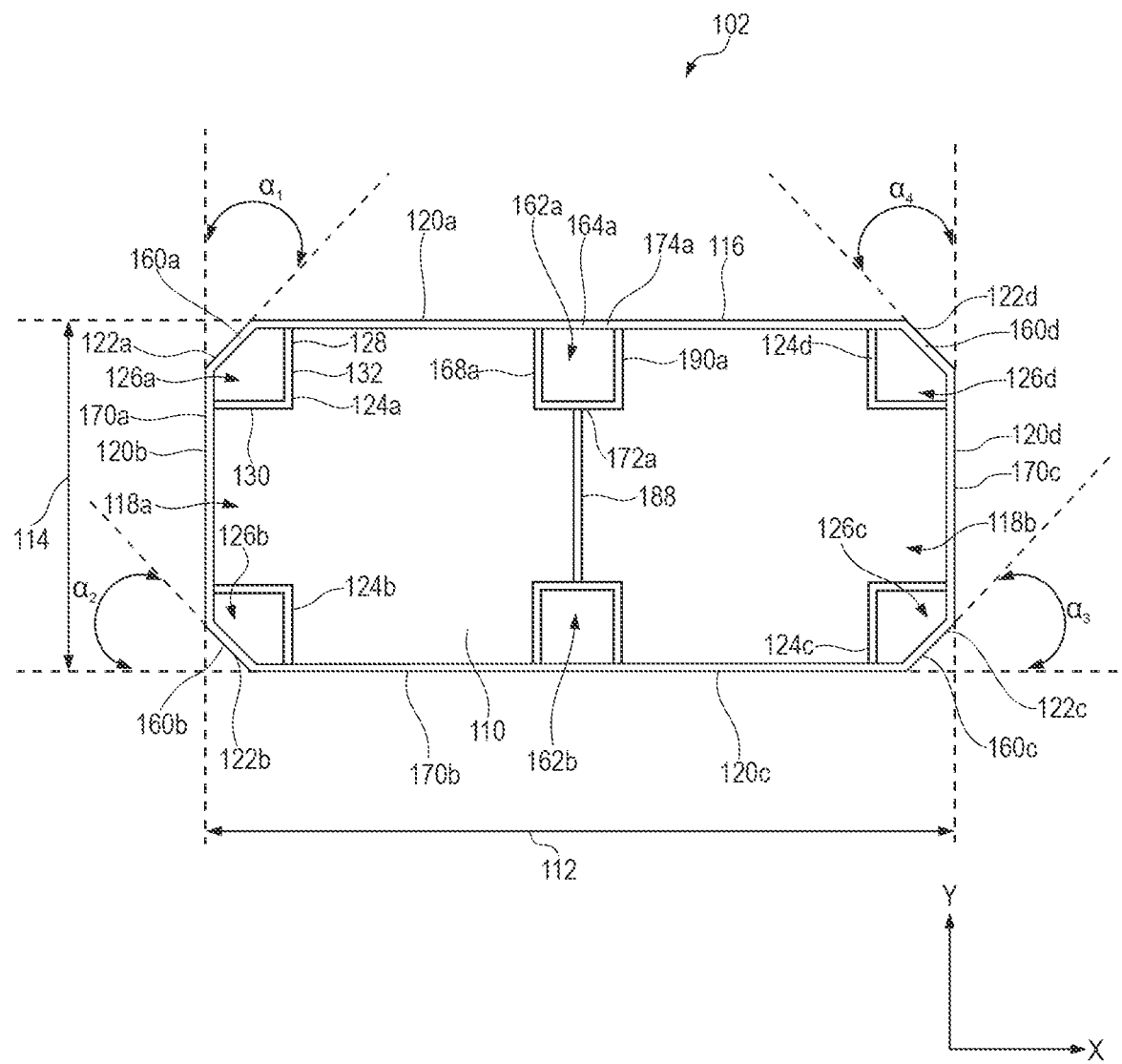
FIG. 3 is a front view of the vehicle component of FIG. 2.
Figure 4:
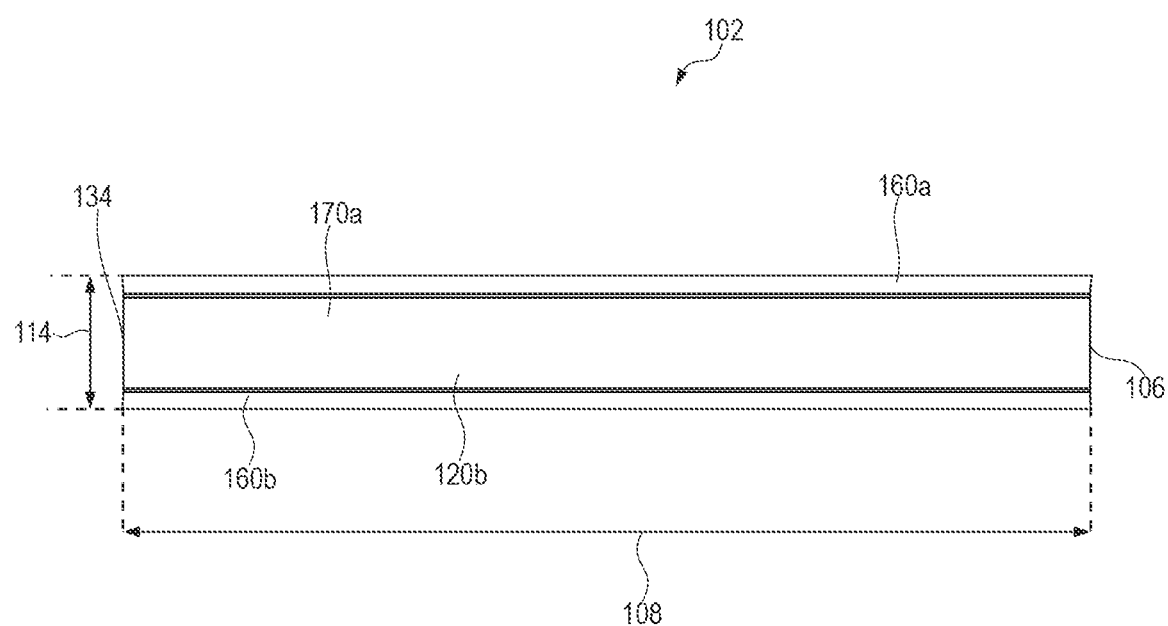
FIG. 4 is a side view of the vehicle component of FIG. 2.
Figure 5:
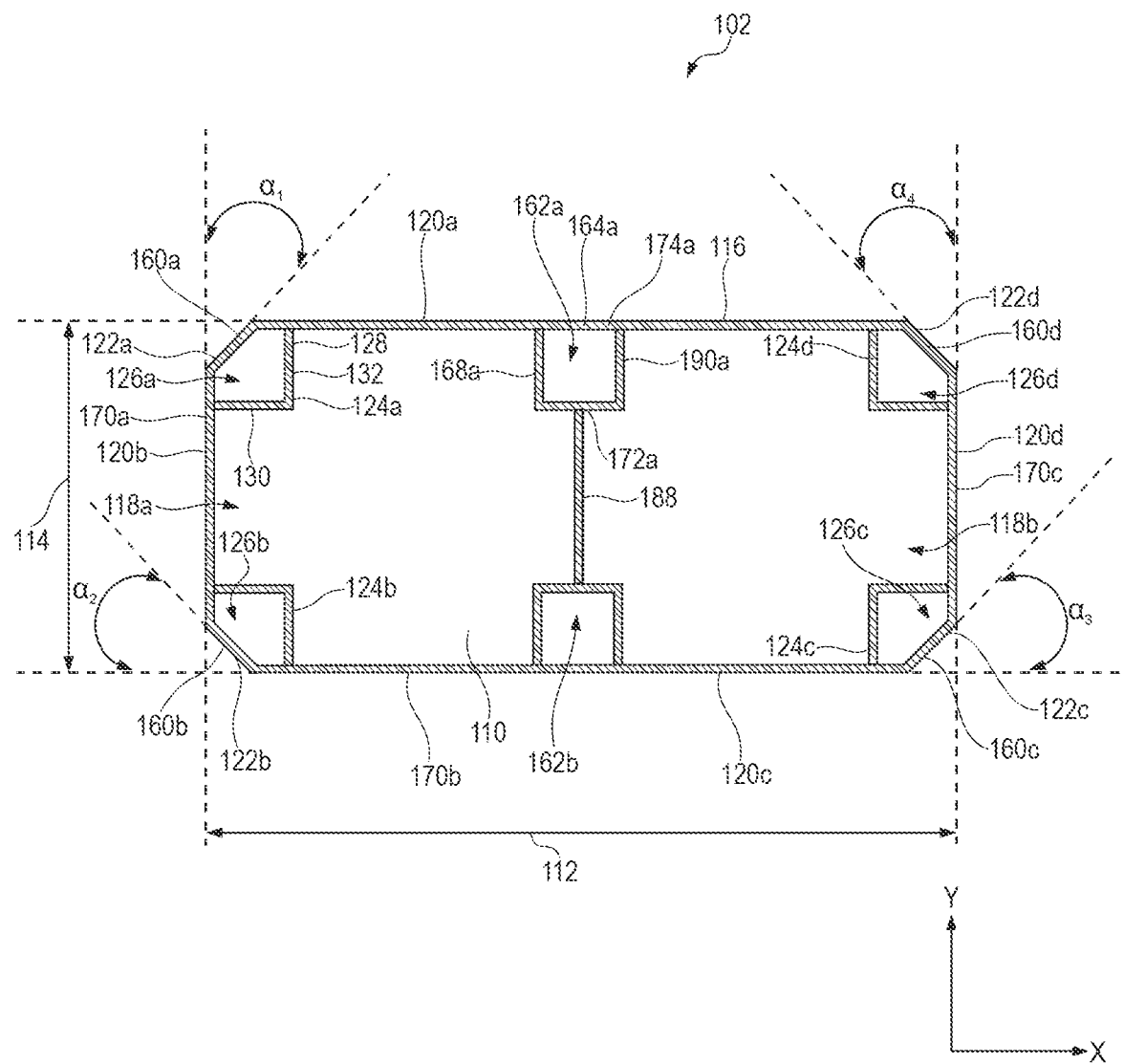
FIG. 5 is a cross-sectional view taken along a line 5-5 of the vehicle component of FIG. 2.

FIG. 3 is a front view of the vehicle component 102, while FIG. 5 is a cross-sectional view of the vehicle component 102 of FIG. 2 taken along line 5-5. FIG. 4 is a side view of the vehicle component 102.

With reference to FIGS. 2-5, the vehicle component 102 is bound by a periphery 116 that is formed by the outer surfaces of the plurality of flanges 120a-120d. The cavity 110 of the vehicle component 102 extends through the periphery 116 along the length 108 of the vehicle component 102.

The plurality of flanges 120a-120d are generally sized and shaped to withstand various operational loads. The flanges 120a, 120c extend along the width 112 of the vehicle component 102 along an X-axis. The flanges 120b, 120d extend along the height 114 of the vehicle component 102 along a Y-axis. The flange 120c is spaced apart from the flange 120a by the height 114 of the vehicle component 102 along the Y-axis. The flange 120d is spaced apart from the flange 120b by the width 112 of the vehicle component 102 along the X-axis.

The vehicle component 102 includes a plurality of corners 122a, 122b, 122c, and 122d that are defined by pairs of the plurality of flanges 120a, 120b, 120c, and 120d. In particular, the corner 122a is defined by the flanges 120a and 120b, while the corner 122b is defined by the flanges 120b and 120c. The corner 122c is defined by the flanges 120c and 120d, while the corner 122d is defined by the flanges 120d and 120a.

The vehicle component 102 includes a plurality of corner portions 124a, 124b, 124c, and 124d, which are located adjacent to the plurality of corners 122a, 122b, 122c, and 122d. In particular, the corner portions 124a and 124b are positioned proximate to the corners 122a and 122b, respectively. The corner portions 124c and 124d are positioned proximate to the corners 122c and 122d, respectively.

The vehicle component 102 includes a plurality of channels or corner cavities 126a, 126b, 126c, and 126d, which are adjacent and proximate to the plurality of corner portions 124a, 124b, 124c, and 124d, respectively. The corner portions 124a, 124b, 124c, and 124d are generally similar, and therefore for the sake of brevity, only the corner portion 124a is described in more detail. The corner portion 124a includes corner portion flanges 128, 130. The corner portion flanges 128, 130, and the corner 122a form a corner periphery 132 of the channel 126a. The corner portion flange 128 extends substantially perpendicularly from the interior surface of the flange 120a along the Y-axis, while the corner portion flange 130 extends substantially perpendicularly from the interior surface of the flange 120b along the X-axis. The corner portion flanges 128, 130 extend substantially perpendicularly to each other, and are arranged to define the channel 126a.

The periphery 116 of the vehicle component 102 is further defined by a plurality of chamfer portions 160a, 160b, 160c, and 160d of the vehicle component 102. In particular, the corner 122a includes the chamfer portion 160a that extends between the flanges 120a, 120b at an acute angle α1 relative to a plane 170a. The corner 122b includes the chamfer portion 160b that extends between the flanges 120b, 120c at an acute angle α2 relative to a plane 170b. The corner 122c includes the chamfer portion 160c that extends between the flanges 120c, 120d at an acute angle α3 relative to the plane 170b. The corner 122d includes the chamfer portion 160d that extends between the flanges 120d and 120a at an acute angle α4 relative to a plane 170c.

The vehicle component 102 further includes a pair of center channels 162a, 162b. The center channels 162a, 162b are generally positioned at a center of the cavity 110. The center channels 162a, 162b are generally similar to each other, and therefore for the sake of brevity, only the center channel 162a is described in more detail herein. The center channel 162a, which is positioned adjacent to the flange 120a, is defined by center channel flanges 168a, 190a, 172a that form a center periphery 174a of the center channel 162a along with a portion 164a of the flange 120a. The center channel flange 172a and portion 164a of the flange 120a extend substantially parallel to each other. The center flange 168a extends perpendicularly relative to the center flange 172a from an end of the center flange 172a and abuts the portion 164a of the flange 120a. The center flange 168a also extends perpendicularly relative to the center flange 172a from an end of the center flange 172a and abuts the portion 164a of the flange 120a.

The vehicle component 102 includes a center flange 188 that extends longitudinally between the center channels 162a, 162b and substantially vertically along the Y-axis. The center flange 188 couples the center channel flanges (e.g., center flange 172a) together, and divides the cavity 110 into a first cavity 118a and a second cavity 118b.

The one or more embodiments of the vehicle component 102 described herein are made from a hollow extrusion, which may provide cost and mass savings while improving the capability to absorb loads, for example, axial loads. For example, in one or more embodiments, gages of the flanges 120a-120d of the vehicle component 102 may be varied, sizes and shapes of channels (e.g., channels 126a-126d, center channels 162a, 162b) provided in the vehicle component 102 may be varied, and locations and number of flanges 120a-120d may be varied to improve efficiencies, cost, weight, and load absorbing capabilities. Moreover, the various embodiments described above can be combined to provide further embodiments. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A vehicle component comprising:
   a plurality of flanges that form a periphery of the vehicle component;
   a cavity extending through the periphery of the vehicle component;
   a corner portion positioned proximate to a corner defined by a pair of the plurality of flanges;
   a channel positioned proximate to the corner portion;
   a pair of center channels, each of the pair of center channels positioned at opposite sides of the periphery of the vehicle component; and
   a center flange extending between the pair of center channels.

2. The vehicle component of claim 1, further comprising:
   a plurality of corner portions, each one of the plurality of corner portions positioned proximate to corners of the plurality of flanges.

3. The vehicle component of claim 2, further comprising:
   a plurality of channels, each one of the plurality of channels positioned proximate to a corresponding corner portion of the plurality of the corner portions.

4. The vehicle component of claim 1 wherein the plurality of flanges include:
   a first flange extending in a first direction,
   a second flange extending in a second direction,
   a third flange extending in the first direction, and
   a fourth flange extending in the second direction.

5. The vehicle component of claim 4 wherein the corner portion is positioned proximate to the corner defined by the first flange and the second flange.

6. The vehicle component of claim 4, further comprising:
   a first chamfer portion that extends between the first flange and the second flange;
   a second chamfer portion that extends between the first flange and the fourth flange;
   a third chamfer portion that extends between the second flange and the third flange; and
   a fourth chamfer portion that extends between the fourth flange and the third flange.

7. The vehicle component of claim 1 wherein each one of the pair of center channels includes a first center channel flange, a second center channel flange, and a third center channel flange that couples the first center channel flange to the second center channel flange, the first, second, and third center channel flanges arranged to define a center cavity extending through the center channel.

8. The vehicle component of claim 1 wherein the corner portion includes:
   a first corner portion flange extending outwardly from a first one of the plurality of flanges, and
   a second corner portion flange extending outwardly from a second one of the plurality of flanges to the first corner portion, the first and second corner portion flanges arranged to define a corner cavity extending through the channel.

9. An extrusion for a vehicle component, the extrusion comprising:
a first flange;
a second flange extending perpendicularly to the first flange;
a third flange extending parallel to the first flange;
a fourth flange extending perpendicularly to the first flange, the first, second, third, and fourth flanges forming a periphery;
a first channel positioned at a first corner of the periphery;
a second channel positioned at a second corner of the periphery;
a pair of center channels, each of the pair of center channels positioned at opposite sides of the periphery; and
a center flange extending between the pair of center channels and cooperating with the pair of center channels to divide the periphery into a first cavity and a second cavity, the first channel located in the first cavity and the second channel located in the second cavity.

10. The extrusion of claim 9 wherein the first channel is defined by a pair of first corner flanges, a first one of the pair of first corner flanges extending perpendicularly relative to a second one of the first pair of corner flanges.

11. The extrusion of claim 10 wherein the first channel is positioned adjacent to the first corner which is defined by the first flange and the second flange.

12. The extrusion of claim 11, further comprising:
a first chamfer portion, which extends between the first flange and the second flange.

13. The extrusion of claim 9, further comprising:
a third channel positioned at a third corner of the periphery; and
a fourth channel positioned at a fourth corner of the periphery.

14. An aluminum extrusion comprising:
a first flange extending in a first direction;
a second flange extending in a second direction;
a third flange spaced apart from the first flange in the second direction, and extending in the first direction;
a fourth flange spaced apart from the second flange in the first direction, and extending in the second direction;
channel portions positioned at corners defined by the first, second, third, and fourth flanges;
a pair of center channels, a first one of the pair of center channels positioned adjacent to the first flange and a second one of the pair of center channels positioned adjacent to the third flange and
a center flange extending between the pair of center channels and cooperating with the pair of center channels to divide a periphery defined by the first, second, third, and fourth flanges into a first cavity and a second cavity, a first channel portion of the channel portions located in the first cavity and a second channel portion of the channel portions located in the second cavity.

15. The aluminum extrusion of claim 14 wherein each channel portion includes a channel cavity that extends a length of the aluminum extrusion.

* * * * *